United States Patent
Choi

(10) Patent No.: US 11,852,061 B1
(45) Date of Patent: Dec. 26, 2023

(54) VEHICLE EXHAUST GAS REDUCTION SYSTEM AND METHOD THEREOF

(71) Applicants: HYUNDAI MOTOR COMPANY, Seoul (KR); Kia Corporation, Seoul (KR)

(72) Inventor: Sungmu Choi, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/108,847

(22) Filed: Feb. 13, 2023

(30) Foreign Application Priority Data

Sep. 20, 2022 (KR) .................. 10-2022-0118414

(51) Int. Cl.
*F01N 3/035* (2006.01)
*F01N 3/20* (2006.01)
(Continued)

(52) U.S. Cl.
CPC ........... *F01N 3/035* (2013.01); *F01N 3/2013* (2013.01); *F01N 3/023* (2013.01); *F01N 3/027* (2013.01); *F01N 3/0233* (2013.01); *F01N 3/2006* (2013.01); *F01N 9/002* (2013.01); *F01N 9/005* (2013.01); *F01N 11/002* (2013.01);
(Continued)

(58) Field of Classification Search
CPC ........ F01N 3/023; F01N 3/0233; F01N 3/025; F01N 3/027; F01N 3/0273; F01N 3/035; F01N 3/0892; F01N 3/2006; F01N 3/2013; F01N 3/2026; F01N 3/2825; F01N 3/2828; F01N 9/002; F01N 9/005; F01N 9/007; F01N 11/002; F01N 11/005; F01N 2240/04; F01N 2240/16; F01N 2330/22; F01N 2340/00; F01N 2550/04; F01N 2550/12; F01N 2550/22; F01N 2900/0422; F01N 2900/0602; F01N 2900/1404; F01N 2900/16; F01N 2900/1602; F01N 2900/1606; F01N 2900/1611; F01N 2900/1626; F02D 41/027; F02D 41/029; F02D 2200/0812; B01D 46/00;
(Continued)

(56) References Cited

U.S. PATENT DOCUMENTS 6,032,461 A * 3/2000 Kinugasa .............. F01N 3/0871
60/285
9,605,578 B1 * 3/2017 Qi ........................... F01N 3/023
(Continued)

*Primary Examiner* — Binh Q Tran
(74) *Attorney, Agent, or Firm* — MORGAN, LEWIS & BOCKIUS LLP

(57) ABSTRACT

A vehicle exhaust gas reduction system positioned in an exhaust system of an engine includes: an electrically heated catalyst (EHC) of heating exhaust gas of the engine by electrically generating heat; a sub-gasoline particulate filter (Sub GPF) heated by operation of the EHC to combust a particulate number (PN) included in the exhaust gas; a main gasoline particulate filter (Main GPF) of purifying the exhaust gas discharged from the engine; and a controller configured for performing PN reduction control by operating the EHC to be On in a low-temperature condition, and increasing a temperature of the Sub GPF to a reference temperature at which soot combustion is possible, combusting the PN passing through the Sub GPF and soot collected in the Sub GPF.

18 Claims, 10 Drawing Sheets

(Case 1)

(Case 2)

(51) Int. Cl.
*F01N 3/027* (2006.01)
*F01N 9/00* (2006.01)
*F01N 11/00* (2006.01)
*F01N 3/023* (2006.01)

(52) U.S. Cl.
CPC ......... *F01N 11/005* (2013.01); *F01N 2240/04* (2013.01); *F01N 2240/16* (2013.01); *F01N 2330/22* (2013.01); *F01N 2340/00* (2013.01); *F01N 2550/04* (2013.01); *F01N 2550/22* (2013.01); *F01N 2900/0422* (2013.01); *F01N 2900/0602* (2013.01); *F01N 2900/1602* (2013.01); *F01N 2900/1606* (2013.01); *F01N 2900/1611* (2013.01)

(58) Field of Classification Search
CPC ............ B01D 46/0057; B01D 46/0058; B01D 46/006; B01D 46/0061; B01D 46/0063
See application file for complete search history.

(56) References Cited

U.S. PATENT DOCUMENTS

| | | | |
|---|---|---|---|
| 10,480,369 B1* | 11/2019 | Dahodwala | F01N 3/106 |
| 2010/0101409 A1* | 4/2010 | Bromberg | B01D 46/44 |
| | | | 96/397 |
| 2013/0111886 A1* | 5/2013 | Gonze | F01N 3/2066 |
| | | | 60/286 |
| 2013/0125524 A1* | 5/2013 | Plummer | F01N 13/002 |
| | | | 60/39.5 |
| 2020/0116061 A1* | 4/2020 | Hupfeld | B60N 2/002 |

\* cited by examiner (Case 1)

(Case 2)

<TEMPERATURE OF SUB GPF>

<TEMPERATURE OF MAIN GPF>

TEMPERATURE PREDICTION USING MATERIAL PROPERTY VALUE: $R\_ehc \propto T\_ehc \rightarrow T\_ehc = f(R\_ehc)$ (Case 1)

(Case 2)

(Case 3)

VEHICLE EXHAUST GAS REDUCTION SYSTEM AND METHOD THEREOF

CROSS-REFERENCE TO RELATED APPLICATION

The present application claims priority to Korean Patent Application No. 10-2022-0118414 filed on Sep. 20, 2022, the entire contents of which is incorporated herein for all purposes by this reference.

BACKGROUND OF THE PRESENT DISCLOSURE

Field of the Present Disclosure

The present disclosure relates to a vehicle exhaust gas reduction system and a method thereof, and more particularly, to a vehicle exhaust gas reduction system which may reduce a particulate number (PN) when starting a vehicle at a low temperature, and a controlling method thereof.

Description of Related Art

In general, governments in Europe and other countries regulate exhaust gas by gradually strengthening emission standards for a harmful substance (e.g., hydrocarbon (HC), nitrogen oxide (NOx), or carbon monoxide (CO)), a particulate matter (PM), and a particle number (PN), included in the exhaust gas emitted from an engine.

Accordingly, major vehicle manufacturers produce vehicles to satisfy the strengthened exhaust gas regulations (standards) of the governments in Europe and other countries.

Meanwhile, it is necessary to reduce emission (EM) (of nonmethane organic gas (NMOG), NOx, or CO) when starting the vehicle in a low-temperature environment of −7° C. to comply with a recently strengthened European vehicle emissions standards (or EU7 standards).

However, an exhaust system provided with an existing gasoline particulate filter (GPF) strengthens catalyst heat-up to satisfy the EM (of NMOG, NOx, or CO) at the low temperature of −7° C. based on the EU7 standards, which inevitably causes increased PM/PN emission when starting the vehicle.

For example, FIG. 9 shows an exhaust system for each case tested to comply with the EU7 standards, and FIG. 10 shows a test result performed in the low-temperature condition of −7° C.

Referring to FIG. 9 and FIG. 10, the existing exhaust system may include an electrically heated catalyst (EHC) for heating up the catalyst, a three-way catalyst converter (TWC), and a gasoline particulate filter (GPF) positioned in an engine compartment (i.e., EHC+TWC+GPF), as shown in Case 1.

Alternatively, the existing exhaust system may include the EHC and the TWC positioned in the engine compartment, and the GPF and an under floor catalytic converter (UCC) positioned in an underfloor (i.e., EHC+TWC+uf_GPF), as shown in Case 2, or the TWC positioned in the engine compartment and the GPF positioned in the underfloor (i.e., TWC+uf_GPF), as shown in Case 3.

As a result of performing a worldwide harmonized light duty driving test cycle (WLTC) test in the low-temperature condition of −7° C., it is found that the exhaust system emits the PN at a level of one to two times an expected regulation value.

In particular, 90% or more of the total emission of the PN may be emitted during 200 seconds after an initial start-up of the vehicle when starting the vehicle at the low temperature even when the exhaust system includes the EHC and GPF.

Therefore, there is a demand for a method of more effectively performing PN reduction in the low-temperature condition to comply with the EU7 standards.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle exhaust gas reduction system which may reduce a particulate number (PN) in exhaust gas as much as possible through a sub-gasoline particulate filter (Sub GPF) heated by an electrically heated catalyst (EHC) and remove a particulate number (PN) included in the remaining exhaust gas through main gasoline particulate filter (Main GPF) at the rear thereof, at a low temperature condition of −7° C. or less and a low-flow rate condition of the exhaust gas to comply with a strengthened European vehicle emissions standards (EU7), and a method thereof.

According to various exemplary embodiments of the present disclosure, a vehicle exhaust gas reduction system positioned in an exhaust system of an engine includes: an electrically heated catalyst (EHC) of heating exhaust gas of the engine by electrically generating heat; a sub-gasoline particulate filter (Sub GPF) heated by operation of the EHC to combust a particulate number (PN) included in the exhaust gas; a main gasoline particulate filter (Main GPF) of purifying the exhaust gas discharged from the engine; and a controller configured for performing PN reduction control by operating the EHC to be On in a low-temperature condition, and increasing a temperature of the Sub GPF to a reference temperature at which soot combustion is possible, combusting the PN passing through the Sub GPF and soot collected in the Sub GPF.

The Sub GPF may be positioned almost right behind the EHC or integrally formed with the EHC.

The Sub GPF may be disposed in an engine compartment of a vehicle together with the EHC, and the Main GPF may be disposed in the engine compartment or an underfloor of the vehicle.

The Sub GPF may be a small filter whose volume and weight are twice or less than volume and weight of the EHC, made of a metal material having high thermal conductivity, and heated up to a temperature following a temperature of the EHC.

The Sub GPF may be a flow-through filter including a plurality of metal foils and a plurality of metal fleeces, and have a structure for collecting the soot when a flow of the exhaust gas passes through the metal fleeces.

The Sub GPF may collect soot when starting the vehicle at the low temperature and the exhaust gas has a low-flow rate, and may be heated up by the EHC when the exhaust gas has a flow rate higher than a predetermined flow rate to discharge the collected soot and PN.

The Sub GPF may include an external frame having a cylindrical structure and a metal foam made of a porous material and positioned inside the frame, and the metal foam may collect soot having a porosity of 50% or more and have a mean pore size of 20 μm or more.

The system may further include: a three-way catalyst converter (TWC) provided between the Sub GPF and the Main GPF to reduce a harmful substance (e.g., hydrocarbon (HC), nitrogen oxide (NOx), or carbon monoxide (CO)) included in the exhaust gas by catalytic action; and an under floor catalytic converter (UCC) provided behind the Main GPF to reduce the harmful substance included in the exhaust gas.

The controller may heat up the EHC by performing pre-heating for a predetermined time period before starting the vehicle at the low temperature, and heat up the Sub GPF through heat transfer of the EHC.

The controller may be configured to control a power supply amount of the EHC when performing the PN reduction control for the temperature of the Sub GPF to be maintained in a range of a first reference temperature at which the soot combustion is possible to a second reference temperature determined in consideration of an endurance limit temperature of the EHC.

The controller may check an engine operation time after starting the vehicle when performing the PN reduction control, and turn off power of the EHC when the engine operation time elapses a reference time t1 required for removing the PN.

The controller may measure a resistance of the EHC which is correlated with the temperature of the Sub GPF when performing the PN reduction control, and control a power supply amount of the EHC for the resistance of the EHC to be maintained in a range of a first reference resistance O1 at which the soot combustion is possible by the Sub GPF to a second reference resistance O2 determined in consideration of an endurance limit temperature of the EHC.

According to various exemplary embodiments of the present disclosure, a controlling method of a vehicle exhaust gas reduction system including a sub-gasoline particulate filter (Sub GPF) provided right behind an electrically heated catalyst (EHC) and a main gasoline particulate filter (Main GPF) provided behind the Sub GPF includes: starting an operation of the EHC to be On to heat up exhaust gas of an engine when a low-temperature condition is satisfied; measuring a temperature of the Sub GPF provided right behind the EHC through a temperature sensor; performing particulate number (PN) reduction control to heat up the temperature of the Sub GPF to satisfy a reference temperature at which soot combustion is possible by adjusting a power supply amount of the EHC based on the temperature of the Sub GPF; and checking an engine operation time from start time of the PN reduction control, and ending the operation of the EHC by turning off power of the EHC when the engine operation time elapses a reference time.

The performing of the PN reduction control may include: supplying a maximum power to the EHC when the temperature of the Sub GPF is less than a first reference temperature at which the soot combustion is possible; controlling the power supply amount of the EHC to maintain a reference temperature range when the temperature of the Sub GPF is in the reference temperature range of the first reference temperature to a second reference temperature determined in consideration of an endurance limit temperature of the EHC; and turning off the power of the EHC when the temperature of the Sub GPF is more than the second reference temperature.

According to various exemplary embodiments of the present disclosure, a controlling method of a vehicle exhaust gas reduction system including a sub-gasoline particulate filter (Sub GPF) provided right behind an electrically heated catalyst (EHC) and a main gasoline particulate filter (Main GPF) provided behind the Sub GPF includes: starting an operation of the EHC to be On to heat up exhaust gas of an engine when a low-temperature condition is satisfied; checking a resistance of the EHC which is correlated with a temperature of the Sub GPF through a resistance sensor; performing particulate number (PN) reduction control to heat up the temperature of the Sub GPF to satisfy a reference temperature at which soot combustion is possible by adjusting a power supply amount of the EHC based on the resistance of the EHC; and checking an engine operation time from start time of the PN reduction control, and ending the operation of the EHC by turning off power of the EHC when the engine operation time elapses a reference time.

The performing of the PN reduction control may include: supplying a maximum power to the EHC when the resistance of the EHC is less than a first reference resistance at which the soot combustion is possible by the GPF; controlling the power supply amount of the EHC to maintain a reference resistance range when the resistance of the EHC is in the reference resistance range of the first reference resistance to a second reference resistance determined in consideration of an endurance limit temperature of the EHC; and turning off the power of the EHC when the resistance of the EHC is more than the second reference resistance.

According to the exemplary embodiments of the present disclosure, it is possible to provide the exhaust gas reduction system satisfying the EU7 standards by improving the PN removal (combustion) efficiency through heating up the EHC and the Sub GPF of the uncoated type when starting/driving the vehicle at the low temperature and the exhaust gas has the low-flow rate.

It is also possible to further improve the exhaust gas reduction efficiency through the cooperation with the Sub GPF by securing the soot regeneration performance and the exhaust gas purification performance by applying the low back pressure and the Main GPF of the coated type.

It is also possible to predict the temperature of the EHC whose surface temperature is unable to be physically measured, through the temperature of the Sub GPF positioned right behind the EHC, or flexibly apply the various exhaust gas low-pressure algorithms predicted through the correlation between the resistance and temperature of the EHC based on a vehicle model or a market environment.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
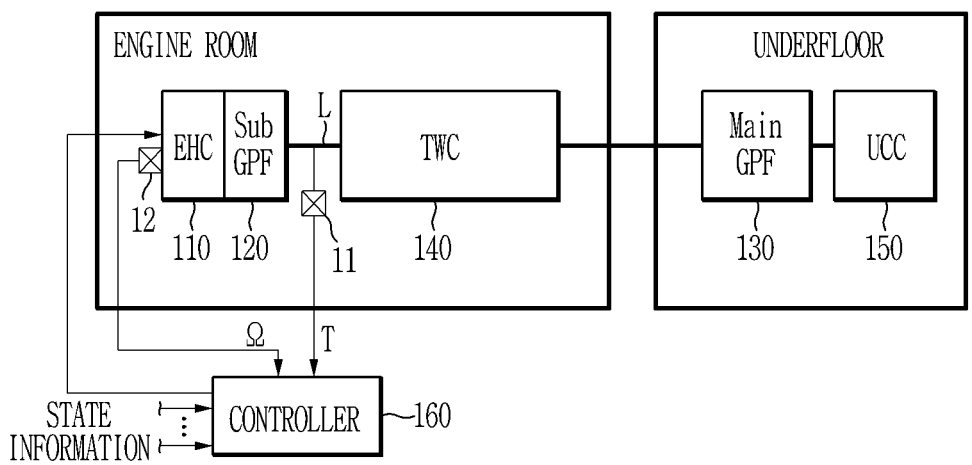
FIG. 1 is a block diagram schematically showing a vehicle exhaust gas reduction system according to various exemplary embodiments of the present disclosure.
Figure 1:
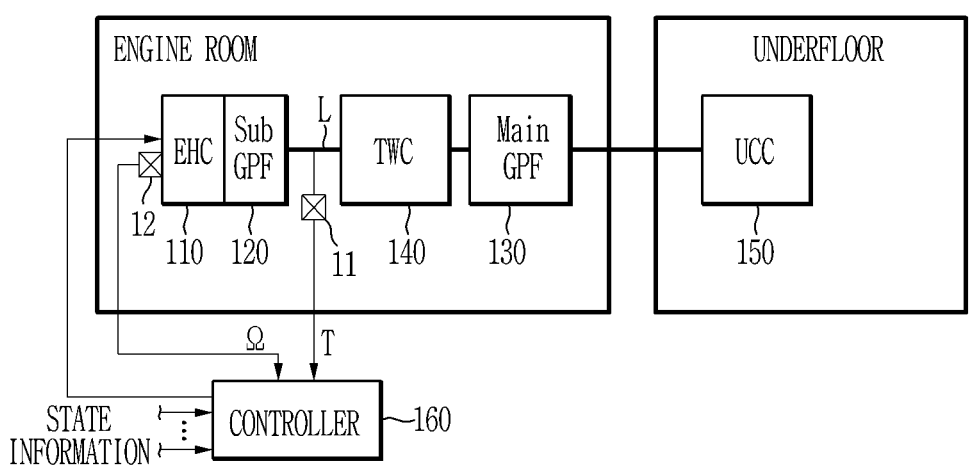

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure are described in detail with reference to the accompanying drawings so that those skilled in the art to which an exemplary embodiment of the present disclosure pertains may easily practice the present disclosure.

A term used herein is used only to describe a specific embodiment, and is not intended to limit the present disclosure. A term of a singular number used herein is intended to include its plural number unless the context clearly indicates otherwise. It should also be understood that the terms "include" and/or "including," when used in the specification, specify the presence of the recited features, integers, steps, operations, elements and/or components, and do not exclude the presence or addition of one or more of other features, integers, steps, operations, elements, components, and/or groups thereof. A term "and/or" used herein includes any one or all combinations of the associated listed items.

Terms such as "first," "second," and the like, may be used to describe various components, and these components are not to be construed as being limited to these terms. These terms are used only to distinguish any component from another component, and the features, sequences, and the like of the corresponding components are not limited to these terms.

It is to be understood that when one component is referred to as being "connected to" or "coupled to" another component, the one component may be directly connected to or directly coupled to another component or connected to or coupled to another component with yet another component interposed therebetween. On the other hand, it is to be understood that when one component is referred to as being "directly connected to" or "directly coupled to" another component, the one component may be connected to or coupled to another component without yet another component interposed therebetween.

Furthermore, it is to be understood that one or more of methods described below or aspects thereof may be executed by at least one or more controllers. The term "controller" may refer to a hardware device including a memory and a processor. The memory may store program instructions, and the processor may be specifically programmed to execute program instructions to perform one or more processes described below in more detail. The controller may be configured to control operations of units, modules, parts, devices, or the like, as described herein. It is also to be understood that the methods described below may be executed by an apparatus including the controller in conjunction with one or more other components, as appreciated by those skilled in the art.

Hereinafter, the description describes a vehicle exhaust gas reduction system and a method thereof according to exemplary embodiments of the present disclosure in detail with reference to the drawings.

FIG. 1 is a block diagram schematically showing the vehicle exhaust gas reduction system according to various exemplary embodiments of the present disclosure.

Referring to FIG. 1, a vehicle exhaust gas reduction system 100 positioned in an exhaust system (L) of an engine according to various exemplary embodiments of the present disclosure may include: an electrically heated catalyst (EHC) 110 heating exhaust gas of the engine by electrically generating heat; a sub-gasoline particulate filter (Sub GPF) 120 heated by operation of the EHC 110 to combust a particulate number (PN) included in the exhaust gas; a main gasoline particulate filter (Main GPF) 130 purifying the exhaust gas discharged from the engine; and a controller 160 performing PN reduction control by operating the EHC 110 (to be On) in an external low-temperature condition and/or a low-flow rate condition of the exhaust gas, and increasing a temperature "T" of the Sub GPF 120 to a reference temperature at which the soot combustion is possible, combusting the PN passing through the Sub GPF 120 and soot collected in the Sub GPF 120.

Here, the vehicle exhaust gas reduction system 100 may further include a three-way catalyst converter (TWC) 140 provided between the Sub GPF 120 and the Main GPF 130 to reduce a harmful substance (e.g., hydrocarbon (HC), nitrogen oxide (NOx), or carbon monoxide (CO)) included in the exhaust gas by catalytic action; and an under floor catalytic converter (UCC) 150 provided behind the Main GPF 130 to reduce the harmful substance included in the exhaust gas.

Furthermore, the vehicle exhaust gas reduction system 100 may include various sensors measuring state information required for exhaust gas reduction control, and include, for example, a temperature sensor 11 positioned behind the Sub GPF 120, a resistance sensor 12 of the EHC 110, and the like, provided therein.

The EHC 110 may be operated based on a control signal of the controller 160 and may adjust a heat-up level based on a power supply amount (or voltage/current).

The Sub GPF 120 may be provided right behind the EHC 110 and disposed in an engine compartment of a vehicle, and the Main GPF 130 may be disposed in the engine compartment or an underfloor of the vehicle.

For example, as shown in Case 1 of FIG. 1, the EHC 110 and the Sub GPF 120 may be disposed in the engine compartment together with the TWC 140, and the Main GPF 130 may be disposed on the underfloor together with the UCC 150.

Furthermore, as shown in Case 2 of FIG. 1, the EHC 110, the Sub GPF 120, and the Main GPF 130 may be disposed in the engine compartment, and the TWC 140 may be disposed between the Sub GPF 120 and the Main GPF 130.

The Sub GPF 120 may be an uncoated type in which a fine particle layer is formed in the filter without a separate coating, and the Main GPF 130 may be a coated type in which the particulate matter is collected by special coating treatment of a honeycomb catalyst in the filter, improving exhaust gas reduction performance through their mutual cooperation.

In more detail, the Main GPF 130 of the coated type may have exhaust gas purification performance while having the same structure as the GPF applied to an existing exhaust system, and thus be advantageous in terms of soot regeneration performance and the exhaust gas purification performance. That is, the Main GPF 130 may have low PN collection efficiency when starting the vehicle at the low temperature, still perform PN collection and PN combustion in an exhaust temperature condition of 600° C. or more in a normal driving, and thus have high overall PN reduction efficiency.

However, there is a limitation thereto because the Main GPF 130 of the coated type has PN filtering efficiency lower than the Sub GPF 120 of the uncoated type, and a back pressure is rapidly increased when a coating amount is increased to increase the PN filtering efficiency. Furthermore, the Main GPF 130 may be positioned behind the TWC 140, the heat-up effect by the EHC 110 may thus be reduced, lowering the PN filtering efficiency when starting the vehicle at the low temperature.

On the other hand, the Sub GPF 120 may effectively comply with PN regulations of EU7 standards due to its higher PN filtering efficiency and lower back pressure than that of the coating type. However, the Sub GPF 120 of the uncoated type may not be suitable for use alone due to its poor soot regeneration performance and lower exhaust gas purification performance.

In consideration of features of the GPF of each type, the exhaust gas reduction system 100 according to the exemplary embodiment of the present disclosure may include the Sub GPF 120 for additional PN reduction in the low-temperature condition together with the Main GPF 130 to comply with the EU7 standards.

Therefore, the exhaust gas reduction system 100 according to the exemplary embodiment of the present disclosure aims to comply with the PN regulation of the EU7 standards by reducing the PN from the exhaust gas as much as possible (e.g., more than 95%) through the Sub GPF 120 heated up by the EHC 110 in the low-temperature condition of −7° C. or less and the low-flow rate condition of the exhaust gas, and purifying the PN contained in the remaining exhaust gas (e.g., to 100%) through the rear Main GPF 130.

Figure 2:
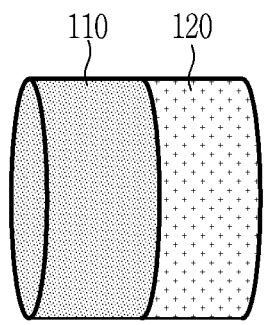
FIG. 2 shows a configuration example of a sub-gasoline particulate filter (Sub GPF) according to various exemplary embodiments of the present disclosure.
Figure 2:
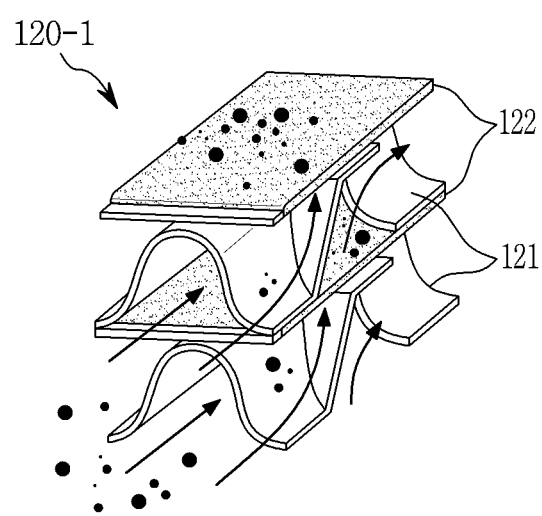
Figure 2:
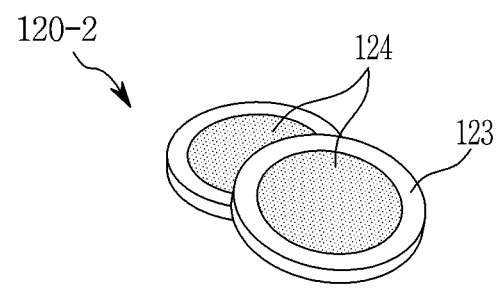

Meanwhile, FIG. 2 shows a configuration example of the Sub GPF according to various exemplary embodiments of the present disclosure.

Referring to FIG. 2, the Sub GPF 120 according to the exemplary embodiment of the present disclosure may be positioned almost right behind the EHC 110 or integrally formed with the EHC 110. Therefore, the temperature "T" of the Sub GPF 120 may follow a temperature of the EHC 110 by maximizing heat transfer efficiency.

Here, the Sub GPF 120 may be a small filter whose volume and weight are twice or less than those of the EHC 110, made of a metal material having high thermal conductivity, and heated up to an approximate (similar) temperature following the temperature of the EHC 110. For example, the Sub GPF 120 may be a small filter with a weight of less than 130 g and a volume of less than 0.2 L.

Furthermore, the Sub GPF 120 may be any one of a first Sub GPF 120-1 and a second Sub GPF 120-2 based on a filter structure.

The first Sub GPF 120-1 may be a flow-through filter including a plurality of metal foils 121 and a plurality of metal fleeces 122, and have a structure for collecting soot when a flow of the exhaust gas passes through the metal fleece 122.

Here, the first Sub GPF 120-1 may collect soot when starting the vehicle at the predetermined temperature and the exhaust gas has a low-flow rate, and may be heated up by the EHC 110 when the exhaust gas has a high-flow rate (e.g., 100 kg/h or more) to discharge the collected soot and PN.

The second Sub GPF 120-2 may include an external frame 123 including a cylindrical structure and a metal foam 124 made of a porous material and positioned inside the frame 123. The metal foam 124 may collect soot having a porosity of 50% or more and have a mean pore size (MPS) of 20 μm or more.

The controller 160 may control overall operations of the exhaust gas reduction system 100 according to various exemplary embodiments of the present disclosure, and store at least one program and data for the vehicle exhaust gas reduction control.

The controller 160 may collect the state information from the various sensors such as the temperature sensor 11 and the resistance sensor 12, and perform the exhaust gas reduction control based on the collected state information.

The controller 160 may heat up the EHC 110 by performing a pre-heating function for a predetermined time period (e.g., 10 seconds) before starting the vehicle at the low temperature, and heat up the Sub GPF 120 through heat transfer of the EHC 110.

Figure 3:
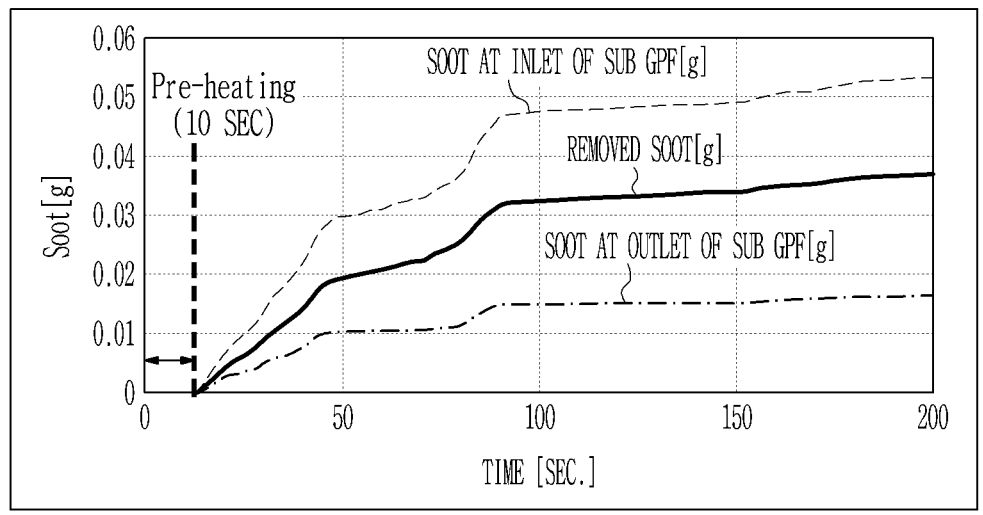
FIG. 3 is a graph showing a result of removing soot from the Sub GPF by heating up an electrically heated catalyst (EHC) according to various exemplary embodiments of the present disclosure.
Figure 3:
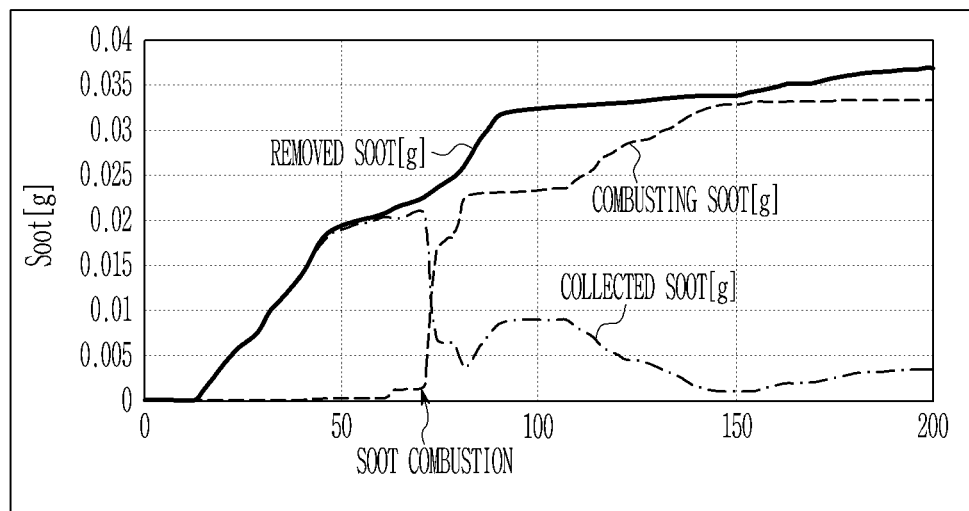

FIG. 3 is a graph showing a result of removing soot from the Sub GPF by heating up the EHC according to various exemplary embodiments of the present disclosure.

Figure 4:
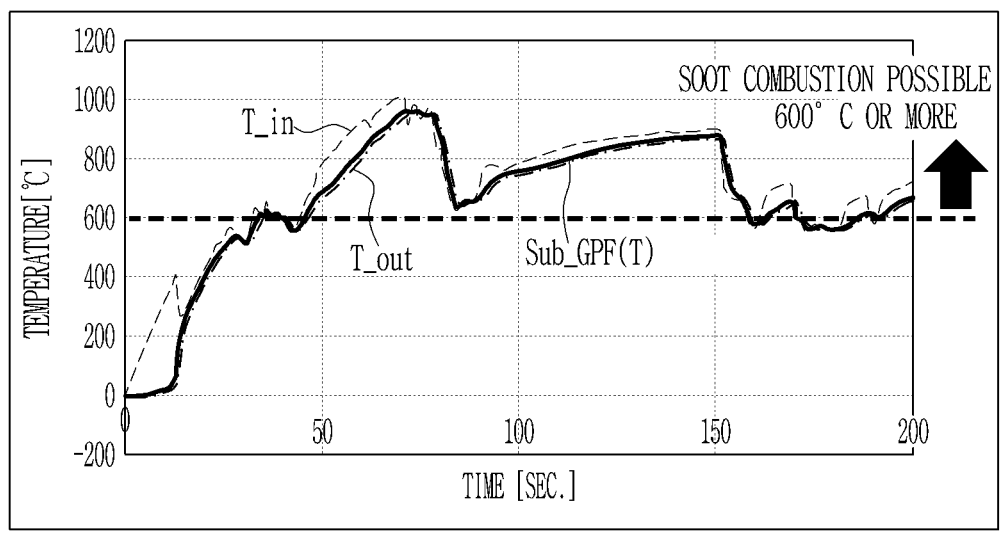
FIG. 4 is a graph showing a temperature of the Sub GPF and a temperature of a main gasoline particulate filter (Main GPF) when heating up the EHC according to various exemplary embodiments of the present disclosure.
Figure 4:
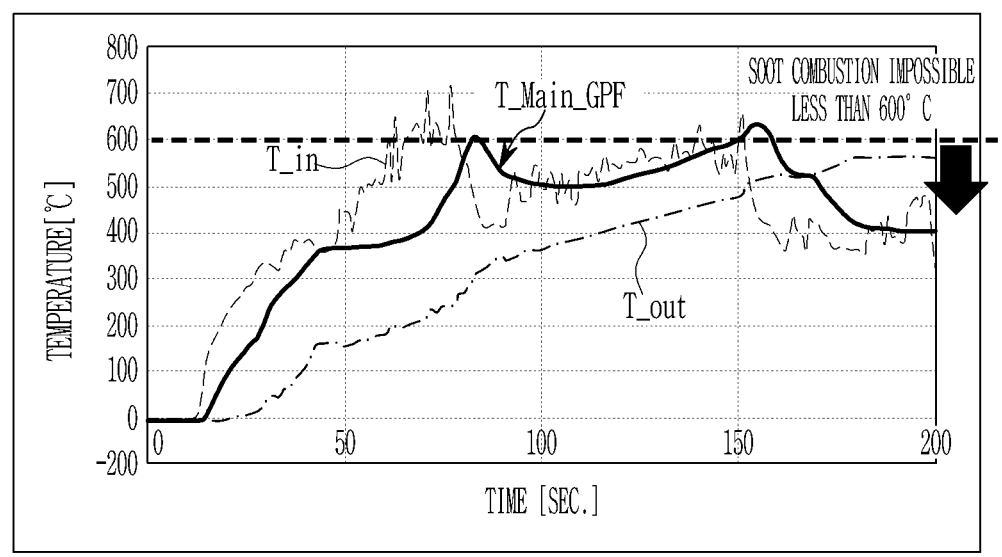

FIG. 4 is a graph showing a temperature of the Sub GPF and a temperature of the Main GPF when heating up the EHC according to various exemplary embodiments of the present disclosure.

Referring to FIG. 3 and FIG. 4, the controller 160 may perform the pre-heating by first operating the EHC 110 before starting the vehicle if the low-temperature condition of −7° C. or less is satisfied when a start signal of the vehicle is input from a driver. The low-temperature condition may make reference to an external temperature or a temperature measured by the temperature sensor 11.

The controller 160 may then control an engine start after heating up the Sub GPF 120 to the reference temperature (e.g., 600° C. or more) or higher at which the soot combustion is possible by the pre-heating.

First referring to FIG. 3, it may be seen that soot [g] detected at an outlet of the Sub GPF is reduced by removed soot [g] compared to soot [g] detected at an inlet of the Sub GPF, based on the Sub GPF 120. Here, the removed soot [g] may be reduced by a sum of soot collected by the Sub GPF 120 and soot combusting at the temperature of 600° C. or more.

Furthermore, referring to FIG. 4, the Sub GPF 120 may be heated up by the EHC 110 to 600° C. or more at which the soot combustion is possible, soot may thus combust, and a large amount of soot may combust after 70 seconds.

On the other hand, the Main GPF 130 may be hardly heated up to 600° C. or more, and soot may thus barely combust. It may be seen that even with the EHC and the GPF like the existing exhaust system described above, there is no soot combustion function when starting the vehicle at the low temperature, which results in high PN emission, and there is thus a limit to complying with the EU7 standards.

Therefore, the exhaust gas reduction system 100 according to various exemplary embodiments of the present disclosure may rapidly reduce the PN emission by collecting and combusting a large amount of PN through the Sub GPF 120 when starting the vehicle at the low temperature.

Figure 5:
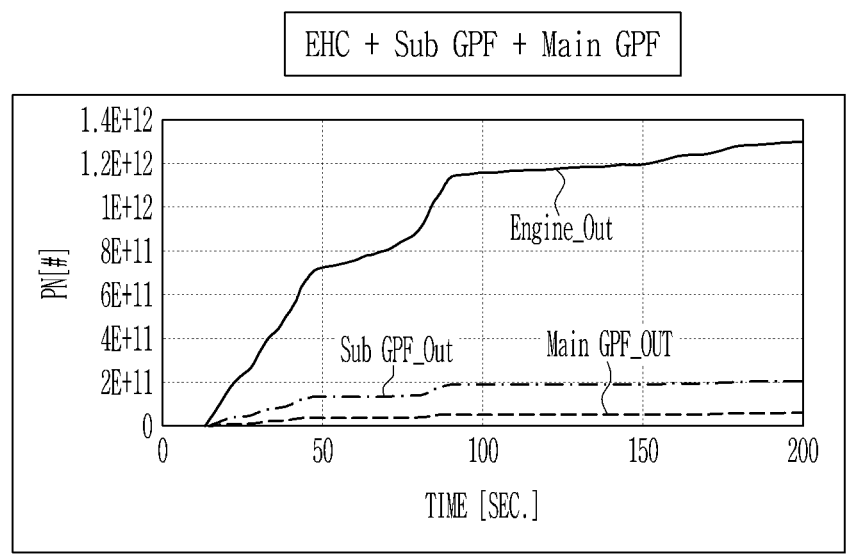
FIG. 5 shows a particulate number (PN) reduction rate of the exhaust gas reduction system according to various exemplary embodiments of the present disclosure.
Figure 5:
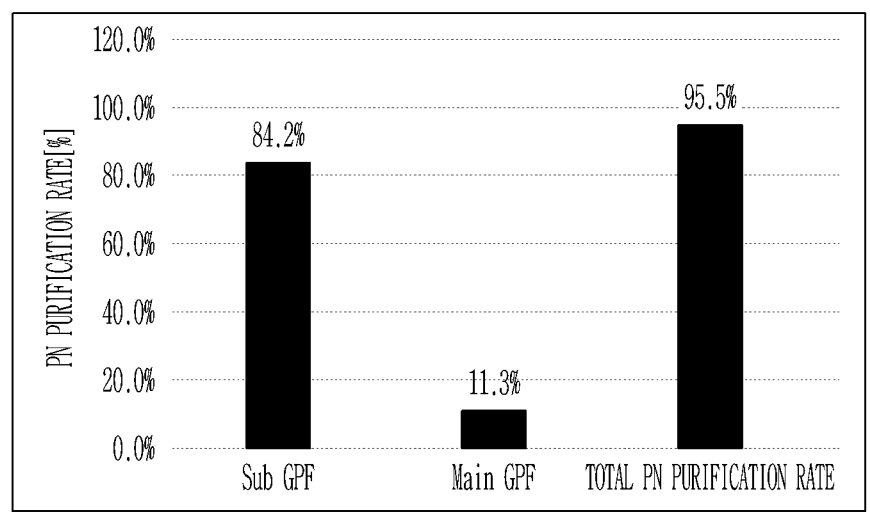

Meanwhile, FIG. 5 shows a particulate number (PN) reduction rate of the exhaust gas reduction system according to various exemplary embodiments of the present disclosure.

Referring to FIG. 5, it is verified that the exhaust gas reduction system 100 according to the exemplary embodiment of the present disclosure operates the engine for 200 seconds while heating up the EHC 110 and performing the PN reduction control through the Sub GPF 120 and the Main GPF 130 in the low-temperature condition, securing a total PN purification rate (or removal rate) of 95% or more by a high PN reduction rate (84.2%) of the Sub GPF 120.

The controller 160 may be implemented as at least one processor operated by a set program, and the set program may be programmed to perform each operation of the vehicle exhaust gas reduction method of the exhaust gas reduction system 100 according to other embodiments of the present disclosure.

The vehicle exhaust gas reduction method is described in more detail through other embodiments with reference to FIG. 6 and FIG. 7 below.

Figure 6:
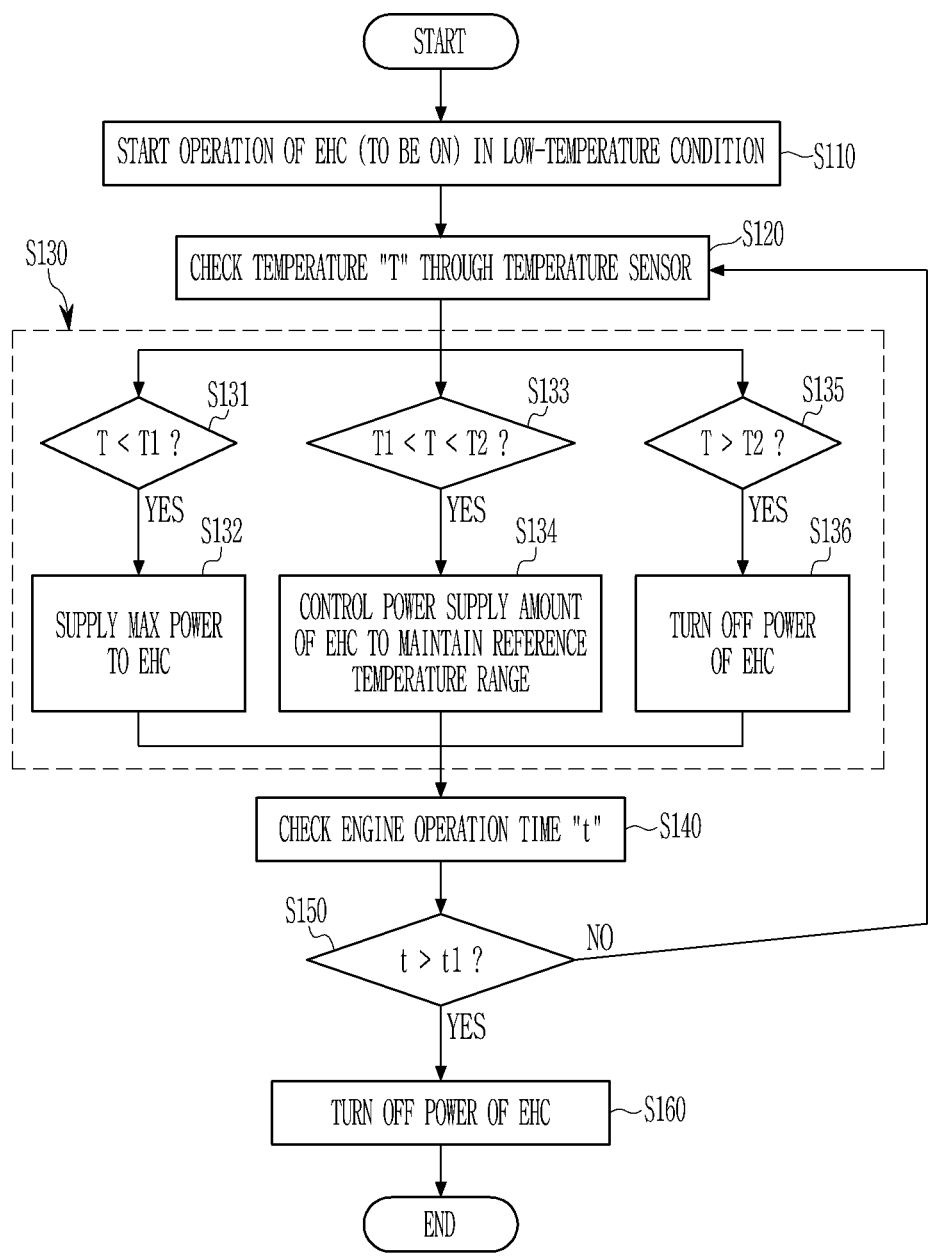
FIG. 6 is a flowchart showing a vehicle exhaust gas reduction method based on a reference temperature according to various exemplary embodiments of the present disclosure.

FIG. 6 is a flowchart showing the vehicle exhaust gas reduction method based on a reference temperature according to the various exemplary embodiments of the present disclosure.

According to the various exemplary embodiments of the present disclosure, a controller 160 may control a power supply amount of an electrically heated catalyst (EHC) 110 when performing particulate number (PN) reduction control for a temperature "T" of a sub-gasoline particulate filter (Sub GPF) 120 to be maintained in a range of a first reference temperature T1 at which soot combustion is possible to a second reference temperature T2 determined in consideration of an endurance limit temperature of the EHC 110. For example, the first reference temperature T1 may be set to 600° C. and the second reference temperature T2 may set the endurance limit temperature of the EHC 110 to 950° C.

Referring to FIG. 6, the controller 160 of the vehicle exhaust gas reduction system 100 according to the various exemplary embodiments of the present disclosure may collect state information through a sensor of a vehicle, and start an operation of the EHC 110 (to be On) to heat up exhaust gas of an engine when a low-temperature condition is satisfied (S110).

Here, the controller 160 may measure the temperature "T" of the Sub GPF 120. For example, the controller 160 may check a temperature of exhaust gas of the EHC 110 through a temperature sensor 11 (S120).

Here, the EHC 110 may be a device which is directly energized, and it is thus impossible to measure a surface temperature of the EHC 110 by allowing the temperature sensor to come into physical contact with the EHC 110. Therefore, as shown in FIG. 1, the temperature sensor 11 may be provided behind the Sub GPF 120 positioned right behind the EHC 110, and having a temperature similar to that of the EHC 110. It is also possible to predict the temperature of the EHC 110 through the exhaust gas temperature measured by one temperature sensor 11 and to simultaneously identify the temperature "T" of the Sub GPF 120. That is, for example, the controller 160 may measure the temperature of the exhaust gas of the EHC 110 as the temperature "T" of the Sub GPF 120.

The controller 160 may perform PN reduction control to heat up the temperature "T" of the Sub GPF 120 to satisfy the reference temperature at which the soot combustion is possible by adjusting the power supply amount of the EHC 110 based on the temperature "T" of the Sub GPF 120 (S130).

For example, the process of performing the PN reduction control (S130) may include at least one of the following processes: a process including determining, by the controller 160, whether the temperature "T" of the Sub GPF 120 is less than the first reference temperature T1 at which the soot combustion is possible (S131), and supplying a maximum power to the EHC 110 (S132) when the temperature "T" of the Sub GPF 120 is less than the first reference temperature T1 (Yes in S131); a process including determining whether the temperature "T" of the Sub GPF 120 is in a reference temperature range of the first reference temperature T1 to a second reference temperature T2 determined in consideration of an endurance limit temperature of the EHC 110 (S133), and controlling the power supply amount of the EHC 110 to maintain the reference temperature range (S134) when the temperature "T" of the Sub GPF 120 is in the reference temperature range (Yes in S133); and a process including determining whether the temperature "T" of the Sub GPF 120 is more than the second reference temperature T2 (S135), and turning off power of the EHC 110 (S136) when the temperature "T" of the Sub GPF 120 is more than the second reference temperature T2 (Yes in S135).

The controller 160 may check an engine operation time "t" from initial time of the PN reduction control (S140), determine whether the engine operation time "t" elapses a reference time t1 required for removing the PN (S150), and end the operation of the EHC 110 by turning off power of the EHC 110 (S160) when the engine operation time "t" elapses the reference time t1 (Yes in S150).

Here, the engine operation time "t" may be set to time when the PN in the exhaust gas that passed through the Sub GPF 120 and the Main GPF 130 is removed close to 100% based on the PN reduction control. The engine operation time "t" may be set by use of data through tests or through a predetermined algorithm (for example, a program or a probabilistic model).

Figure 7:
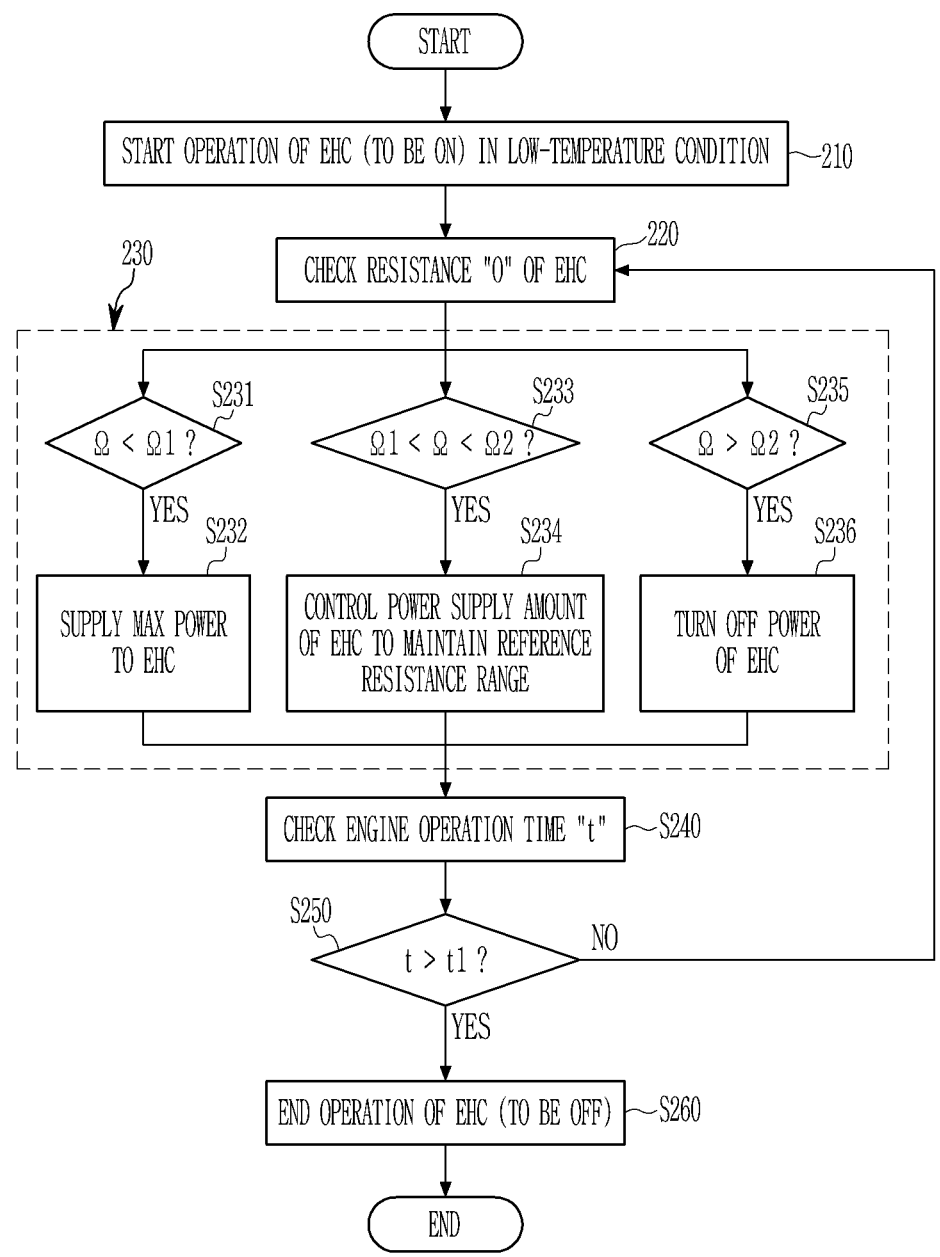
FIG. 7 is a flowchart showing a vehicle exhaust gas reduction method based on a reference temperature according to various exemplary embodiments of the present disclosure.

FIG. 7 is a flowchart showing a vehicle exhaust gas reduction method based on a reference temperature according to the various exemplary embodiments of the present disclosure.

According to the various exemplary embodiments of the present disclosure, a controller 160 may measure a resistance "0" of an electrically heated catalyst (EHC) 110 which is correlated with a temperature "T" of the sub-gasoline particulate filter (Sub GPF) 120 when performing particulate number (PN) reduction control, and control a power supply amount of the EHC 110 for the resistance "0" of the EHC 110 to be maintained in a range of a first reference resistance O1 at which soot combustion is possible by the Sub GPF 120 to a second reference resistance O2 determined in consideration of an endurance limit temperature of the EHC 110. In the present way, the temperature "T" of the Sub GPF 120 may be maintained in a range of 600° C. to 950° C. at which the soot combustion is possible.

Referring to FIG. 7, the controller 160 of the vehicle exhaust gas reduction system 100 according to the various exemplary embodiments of the present disclosure may collect state information through a sensor of a vehicle, and start an operation of the EHC 110 (to be On) to heat up exhaust gas of an engine when a low-temperature condition is satisfied (S210).

Here, the controller 160 may check the resistance "0" of the EHC 110 which is correlated with the temperature "T" of the Sub GPF 120 through a resistance sensor 12 (S220).

Figure 8:
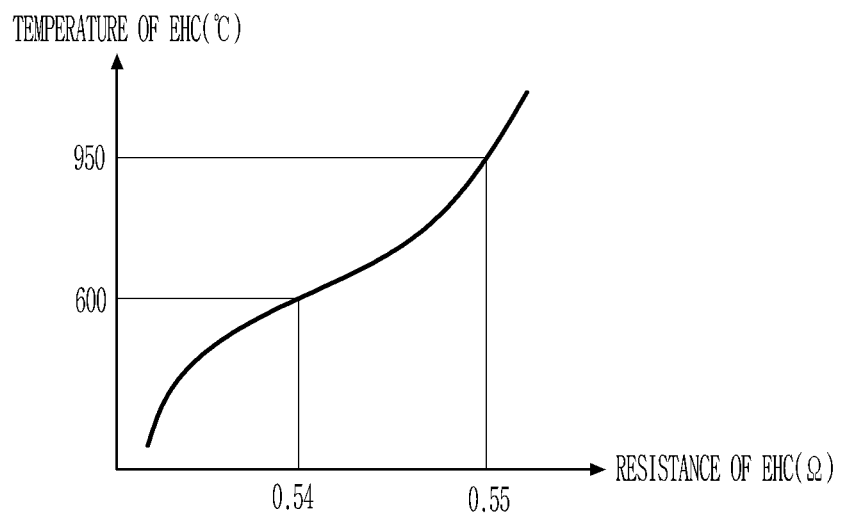
FIG. 8 is a graph showing a correlation between the resistance and temperature of the EHC according to the various exemplary embodiments of the present disclosure.
Figure 9:
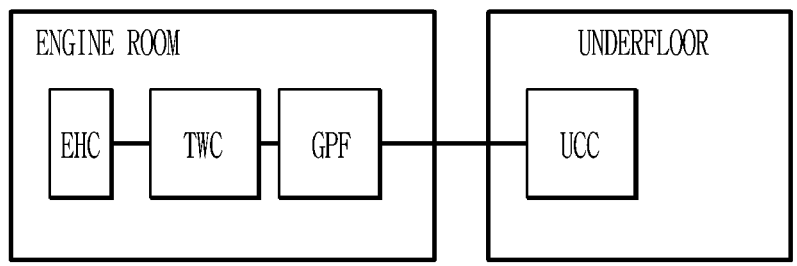
FIG. 9 shows an exhaust system for each case tested to comply with European vehicle emissions standards (EU7).
Figure 9:
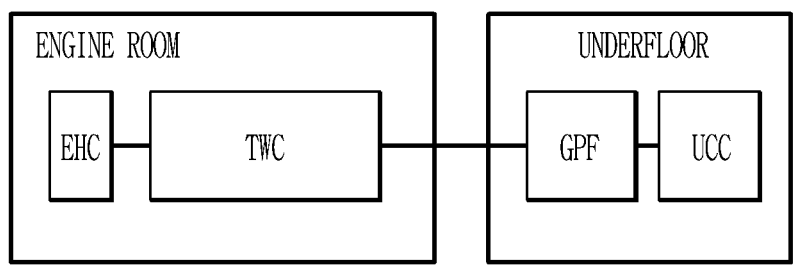
Figure 9:
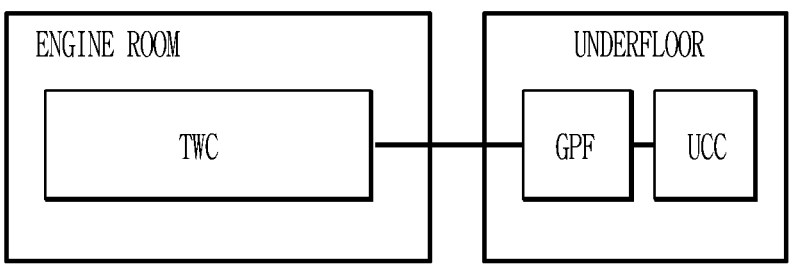
Figure 10:
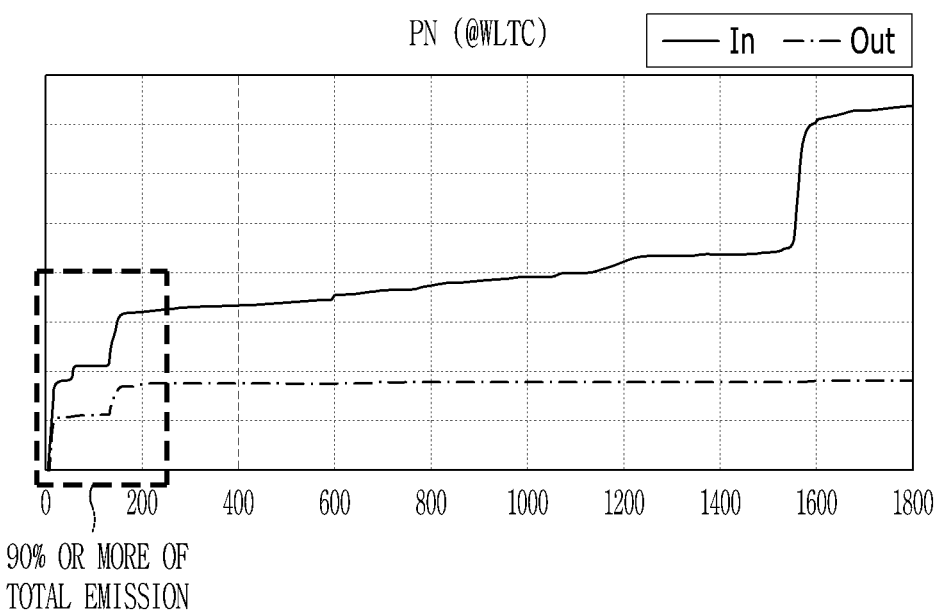
FIG. 10 shows test results in a low-temperature condition of −7° C.
Figure 10:
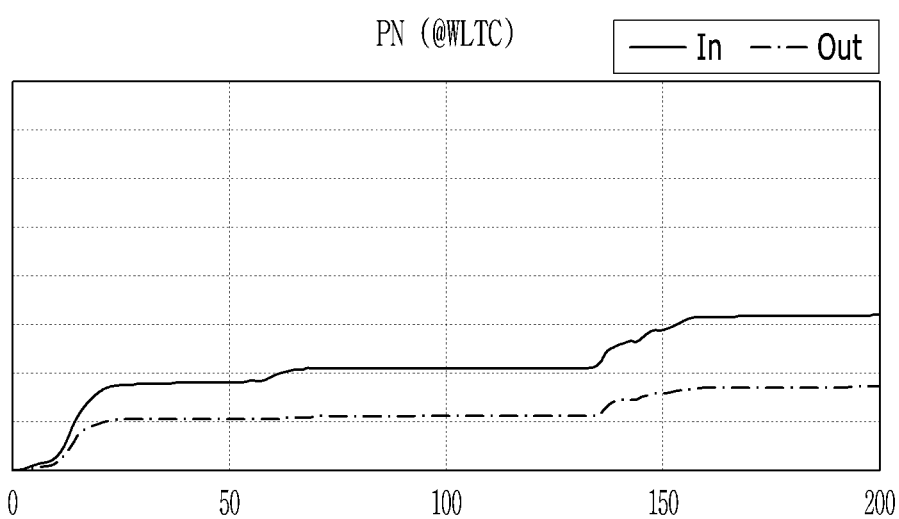

For example, FIG. 8 is a graph showing a correlation between the resistance and temperature of the EHC according to the various exemplary embodiments of the present disclosure.

Referring to FIG. 8, the various exemplary embodiments of the present disclosure in the FIG. 8 may be different from the various exemplary embodiments described above in FIG. 6 in predicting a temperature of the EHC 110 through a non-contact method by use of a unique material property in which a resistance of a metal is increased as the metal included in the EHC 110 is heated up.

For example, the controller 160 may check the resistance value "R" using a voltage "V" and a current "I" through the resistance sensor 12 when the EHC 110 is operated (i.e., R=V/I), and predict the temperature ° C. of the EHC 110 by use of a material property value in consideration of the correlation between the resistance "0" and the temperature ° C. (e.g., $R\_ehc \propto T\_ehc \rightarrow T\_ehc = f(R\_ehc)$).

The controller 160 may perform PN reduction control to heat up the temperature "T" of the Sub GPF 120 to satisfy the reference temperature at which the soot combustion is possible by adjusting the power supply amount of the EHC 110 based on the resistance "0" of the EHC 110 (S230).

For example, the process of performing the PN reduction control (S230) may include at least one of the following processes: a process including determining, by the controller 160, whether the resistance "0" of the EHC is less than a first reference resistance O1 at which the soot combustion is possible by the Sub GPF 120 (S231), and supplying a maximum power to the EHC 110 (S232) when the resistance "0" of the EHC is less than the first reference resistance O1 (Yes in S231); a process including determining whether the resistance "0" of the EHC is in a reference resistance range of the first reference resistance O1 to a second reference resistance O2 determined in consideration of an endurance limit temperature of the EHC 110 (S233), and controlling the power supply amount of the EHC 110 to maintain the reference resistance range (S234) when the resistance "0" of the EHC is in the reference resistance range (Yes in S233); and a process including determining whether the resistance "0" of the EHC is more than the second reference resistance O2 (S235), and turning off the power of the EHC 110 (S236) when the resistance "0" of the EHC is more than the second reference resistance O2 (Yes in S235).

The controller 160 may check an engine operation time "t" from start time of the PN reduction control (S240), determine whether the engine operation time "t" elapses a reference time t1 required for removing the PN (S250), and end the operation of the EHC 110 by turning off the power of the EHC 110 (S260) when the engine operation time "t" elapses the reference time t1 (Yes in S250).

As set forth above, according to the exemplary embodiments of the present disclosure, it is possible to provide the exhaust gas reduction system satisfying the EU7 standards by improving the PN removal (combustion) efficiency through heating up the EHC and the Sub GPF of the uncoated type when starting/driving the vehicle at the low temperature and the exhaust gas has a low-flow rate.

It is also possible to further improve the exhaust gas reduction efficiency through the cooperation with the Sub GPF by securing the soot regeneration performance and the exhaust gas purification performance by applying the low back pressure and the Main GPF of the coated type.

It is also possible to predict the temperature of the EHC whose surface temperature is unable to be physically measured through the temperature of the Sub GPF positioned right behind the EHC, or flexibly apply various the exhaust gas low-pressure algorithms predicted through the correlation between the resistance and temperature of the EHC based on a vehicle model or a market environment.

The exemplary embodiments of the present disclosure may be implemented not only through the system and/or method described above, but also through a program for realizing a function corresponding to the configuration of the exemplary embodiments of the present disclosure, a recording medium in which the program is recorded, or the like. Such an implementation may be easily made by those in the art to which an exemplary embodiment of the present disclosure pertains from the description of the exemplary embodiments described above.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle exhaust gas reduction system positioned in an exhaust system of an engine the vehicle exhaust gas reduction system comprising:
    an electrically heated catalyst (EHC) of heating exhaust gas of the engine by electrically generating heat;
    a sub-gasoline particulate filter (Sub GPF) heated by operation of the EHC to combust a particulate number (PN) included in the exhaust gas;
    a main gasoline particulate filter (Main GPF) of purifying the exhaust gas discharged from the engine; and
    a controller configured for performing PN reduction control by operating the EHC to be On in a low-temperature condition, and increasing a temperature of the Sub GPF to a reference temperature at which soot combustion is possible, combusting the PN passing through the Sub GPF and soot collected in the Sub GPF.

2. The vehicle exhaust gas reduction system of claim 1, wherein the Sub GPF is positioned behind the EHC or integrally formed with the EHC.

3. The vehicle exhaust gas reduction system of claim 1, wherein the Sub GPF is disposed in an engine compartment of a vehicle together with the EHC, and the Main GPF is disposed in the engine compartment or an underfloor of the vehicle.

4. The vehicle exhaust gas reduction system of claim 1, wherein the Sub GPF is a filter whose volume and weight are twice or less than volume and weight of the EHC, made of a metal material having predetermined thermal conductivity, and heated up to a temperature following a temperature of the EHC.

5. The vehicle exhaust gas reduction system of claim 4, wherein the Sub GPF is a flow-through filter including a plurality of metal foils and a plurality of metal fleeces, and have a structure for collecting the soot when a flow of the exhaust gas passes through the metal fleeces.

6. The vehicle exhaust gas reduction system of claim 5, wherein the Sub GPF collects the soot when starting a vehicle at a temperature lower than a predetermined temperature and the exhaust gas has a fow rate lower than a predetermined flow rate, and is heated up by the EHC when the exhaust gas has a flow rate higher than a predetermined flow rate to discharge the collected soot and PN.

7. The vehicle exhaust gas reduction system of claim 4, wherein the Sub GPF includes an external frame including a cylindrical structure and a metal foam made of a porous material and positioned inside the external frame, and the metal foam collects the soot including a porosity of 50% or more than the 50% and has a mean pore size of 20 or more than the 20 μm.

8. The vehicle exhaust gas reduction system of claim 1, further including:
    a three-way catalyst converter (TWC) provided between the Sub GPF and the Main GPF to reduce at least one of substances including hydrocarbon (HC), nitrogen oxide (NOx), or carbon monoxide (CO) included in the exhaust gas by catalytic action; and
    an under floor catalytic converter (UCC) provided behind the Main GPF to reduce the at least one of the substances included in the exhaust gas.

9. The vehicle exhaust gas reduction system of claim 1, wherein the controller is configured to heat up the EHC by performing pre-heating for a predetermined time period before starting a vehicle at a temperature lower than a predetermined temperature, and to heat up the Sub GPF through heat transfer of the EHC.

10. The vehicle exhaust gas reduction system of claim 1, wherein the controller is configured to control a power supply amount of the EHC when performing the PN reduction control for the temperature of the Sub GPF to be maintained in a range of a first reference temperature at which the soot combustion is possible to a second reference temperature determined in consideration of an endurance limit temperature of the EHC.

11. The vehicle exhaust gas reduction system of claim 10, wherein the controller is configured to check an engine operation time after starting a vehicle when performing the PN reduction control, and to turn off power of the EHC when the engine operation time elapses a reference time required for removing the PN.

12. The vehicle exhaust gas reduction system of claim 1, wherein the controller is configured to measure a resistance of the EHC which is correlated with the temperature of the Sub GPF when performing the PN reduction control, and is configured to control a power supply amount of the EHC for the resistance of the EHC to be maintained in a range of a first reference resistance at which the soot combustion is possible by the Sub GPF to a second reference resistance determined in consideration of an endurance limit temperature of the EHC.

13. A controlling method of a vehicle exhaust gas reduction system including a sub-gasoline particulate filter (Sub GPF) provided behind an electrically heated catalyst (EHC) and a main gasoline particulate filter (Main GPF) provided behind the Sub GPF, the method comprising:
　　starting, by a controller, an operation of the EHC to be On to heat up exhaust gas of an engine when a low-temperature condition is satisfied;
　　measuring, by the controller, a temperature of the Sub GPF provided behind the EHC through a temperature sensor;
　　performing, by the controller, particulate number (PN) reduction control to heat up the temperature of the Sub GPF to satisfy a reference temperature at which soot combustion is possible by adjusting a power supply amount of the EHC based on the temperature of the Sub GPF; and
　　checking, by the controller, an engine operation time from start time of the PN reduction control, and ending, by the controller, the operation of the EHC by turning off power of the EHC when the engine operation time elapses a reference time.

14. The method of claim 13, wherein the performing of the PN reduction control includes:
　　supplying a maximum power to the EHC when the temperature of the Sub GPF is less than a first reference temperature at which the soot combustion is possible;
　　controlling the power supply amount of the EHC to maintain a reference temperature range when the temperature of the Sub GPF is in the reference temperature range of the first reference temperature to a second reference temperature determined in consideration of an endurance limit temperature of the EHC; and
　　turning off the power of the EHC when the temperature of the Sub GPF is more than the second reference temperature.

15. A method of controlling a vehicle exhaust gas reduction system including a sub-gasoline particulate filter (Sub GPF) provided behind an electrically heated catalyst (EHC) and a main gasoline particulate filter (Main GPF) provided behind the Sub GPF, the method comprising:
　　starting, by a controller, an operation of the EHC to be On to heat up exhaust gas of an engine when a low-temperature condition is satisfied;
　　checking, by the controller, a resistance of the EHC which is correlated with a temperature of the Sub GPF through a resistance sensor;
　　performing, by the controller, particulate number (PN) reduction control to heat up the temperature of the Sub GPF to satisfy a reference temperature at which soot combustion is possible by adjusting a power supply amount of the EHC based on the resistance of the EHC; and
　　checking, by the controller, an engine operation time from start time of the PN reduction control, and ending the operation of the EHC by turning off power of the EHC when the engine operation time elapses a reference time.

16. The method of claim 15, wherein the performing of the PN reduction control includes:
　　supplying a maximum power to the EHC when the resistance of the EHC is less than a first reference resistance at which the soot combustion is possible by the GPF;
　　controlling the power supply amount of the EHC to maintain a reference resistance range when the resistance of the EHC is in the reference resistance range of the first reference resistance to a second reference resistance determined in consideration of an endurance limit temperature of the EHC; and
　　turning off the power of the EHC when the resistance of the EHC is more than the second reference resistance.

17. A non-transitory computer readable storage medium on which a program for performing the method of claim 13 is recorded.

18. A non-transitory computer readable storage medium on which a program for performing the method of claim 15 is recorded.

* * * * *